WILLIAM S. HICKS.

Pencil-Case.

No. 5,036. Reissued Aug. 20, 1872.

Witnesses.

Harry King.

H. H. Dodge.

Inventor.

Wm S. Hicks, by Dodges & Munn

Attys.

AM. PHOTO-LITHOGRAPHIC CO. N.Y. (OSBORNE'S PROCESS.)

UNITED STATES PATENT OFFICE.

WILLIAM S. HICKS, OF NEW YORK, N. Y.

DESIGN FOR A PENCIL-CASE.

Specification forming part of Design No. 5,851, dated May 14, 1872; reissue No. 5,036, dated August 20, 1872.

SPECIFICATION.

*To all whom it may concern:*

Be it known that I, WILLIAM S. HICKS, of New York, in the county of New York and State of New York, have invented certain new and useful Improvements in Designs for Pen and Pencil Cases; and I do hereby declare that the following is a full, clear, and exact description thereof, reference being had to the accompanying drawing making a part of this specification, and to the letters of reference marked thereon, like letters indicating like parts wherever they occur.

To enable others skilled in the art to construct and use my invention, I will proceed to describe it.

My invention consists in a new design for a case for pens, pencils, tooth-picks, &c., by which they are rendered highly ornamental.

Figure 1:
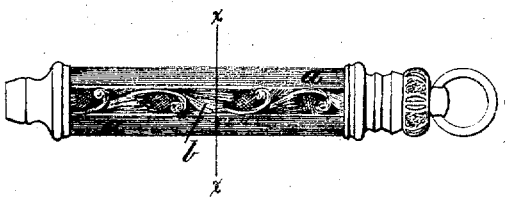
Figure 2:
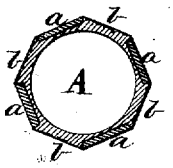

To construct a case embodying my design, I make the body A of the case of any desired form and size, and cover its exterior with alternate strips of metal and mother-of-pearl or similar ornamental material, the latter preferably being set into the case so as to come flush with the exterior surface, as shown in Fig. 2, which is a transverse section on line *x x* of Fig. 1. The metal strips are represented by *b* and the pearl or other similar material by *a*. The metal surfaces or strips *b* will be made of gold, and may be engraved or otherwise ornamented, as represented in Fig. 1; or they may be left plain—the design consisting of the combination of the metallic and pearl or other surfaces, by which a highly-ornamented case is produced.

What I claim is—

The design for a case for pens, pencils, tooth-picks, and similar articles, as herein shown and described.

WM. S. HICKS.

Witnesses:
W. H. SEMBLER,
FORMAN WHITNEY.